Dec. 25, 1956  J. M. STIMETZ ET AL  2,775,478
VEHICLE DOOR HINGE AND CAM

Filed Jan. 19, 1954　　　　　　　　　　　　　　　　2 Sheets-Sheet 1

INVENTORS
JOSEPH M. STIMETZ
ROBERT McCLURE
BY
Paul Fitzpatrick
ATTORNEY

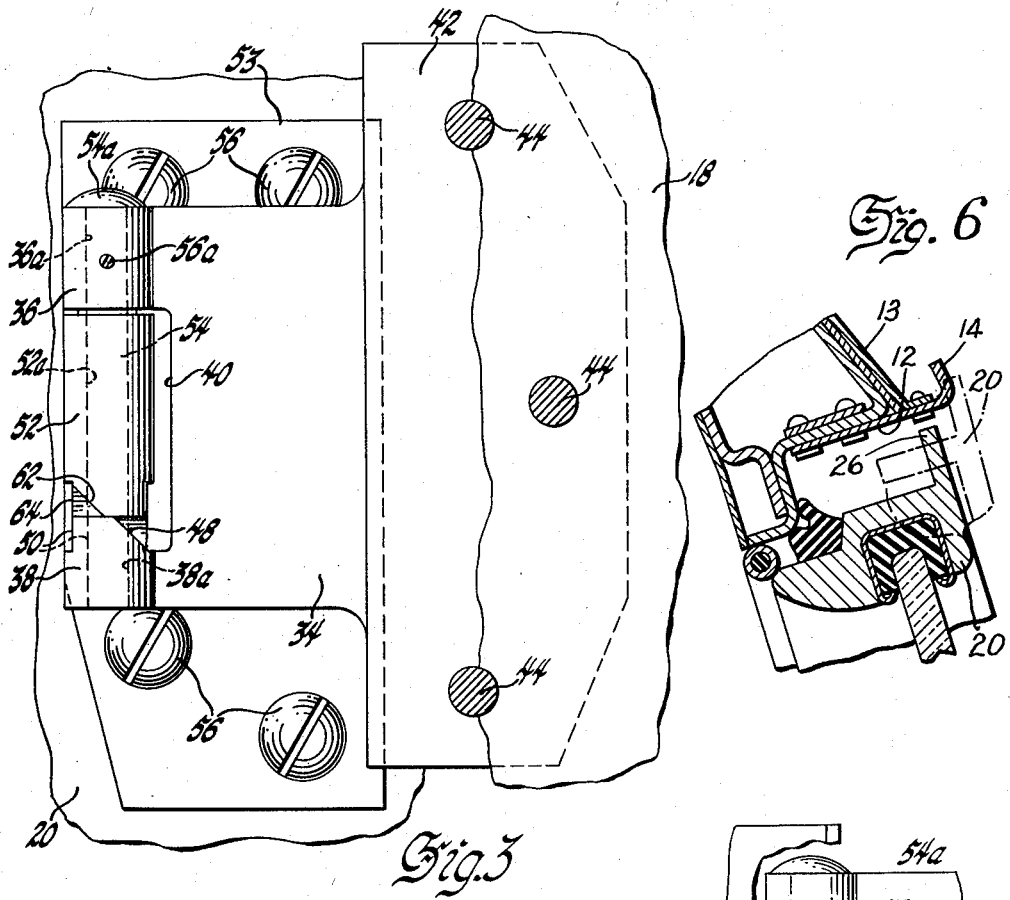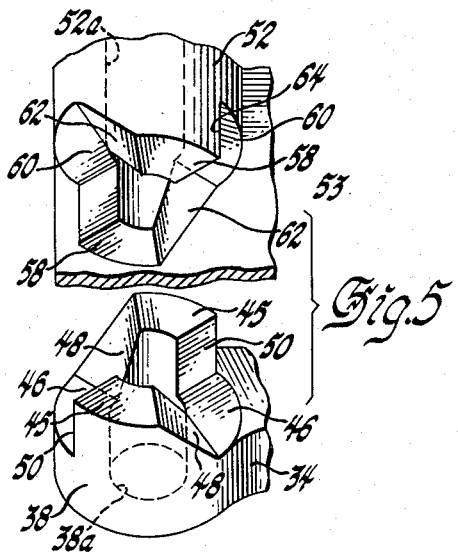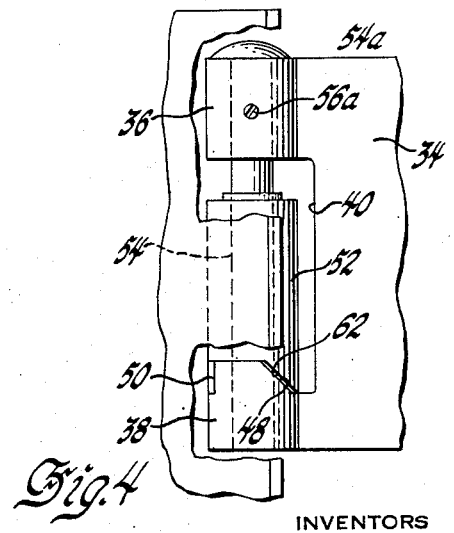

United States Patent Office  2,775,478
Patented Dec. 25, 1956

2,775,478

VEHICLE DOOR HINGE AND CAM

Joseph M. Stimetz, Detroit, and Robert McClure, Highland Park, Mich., assignors to General Motors Corporation, Detroit, Mich., a corporation of Delaware Application January 19, 1954, Serial No. 404,871

5 Claims. (Cl. 296—44)

This invention relates to a door hinge and cam, and more particularly to a hinge and cam for an automobile door.

One feature of the invention is that it provides an improved door hinge; another feature of the invention is that it provides a hinge having relatively rotatable parts with complementary cam surfaces arranged to cause relative bodily movement between the hinge parts during at least a portion of the pivotal movement of said parts; a further feature of the invention is that it provides a hinge for an automobile door including a cam in the hinge for lowering the door as it swings from closed to open position; and yet another feature of the invention is that it provides a hinge having parts with abutting bearing surfaces, each including a sloping cam portion arranged to cause bodily movement between the hinge parts during at least a portion of the pivotal movement between certain parts; and yet a further feature of the invention is that the bearing surface of each hinge part comprises an upper supporting portion and a lower supporting portion spaced by sloping cam portions.

Other features and advantages of the invention will be apparent from the following description and from the drawings, in which:

Fig. 3 is a section through the body pillar taken along the line 3—3 of Fig. 2 and showing the door in closed position;

Fig. 4 is a fragmentary view of the hinge similar to a portion of Fig. 3, but showing the position of the parts when the door is open;

Fig. 5 is an exploded view of part of the hinge showing the bearing surfaces of the hinge members in perspective; and Fig. 6 is a vertical transverse section through a portion of the roof and door, taken along the line 6—6 of Fig. 1.

Figure 1:
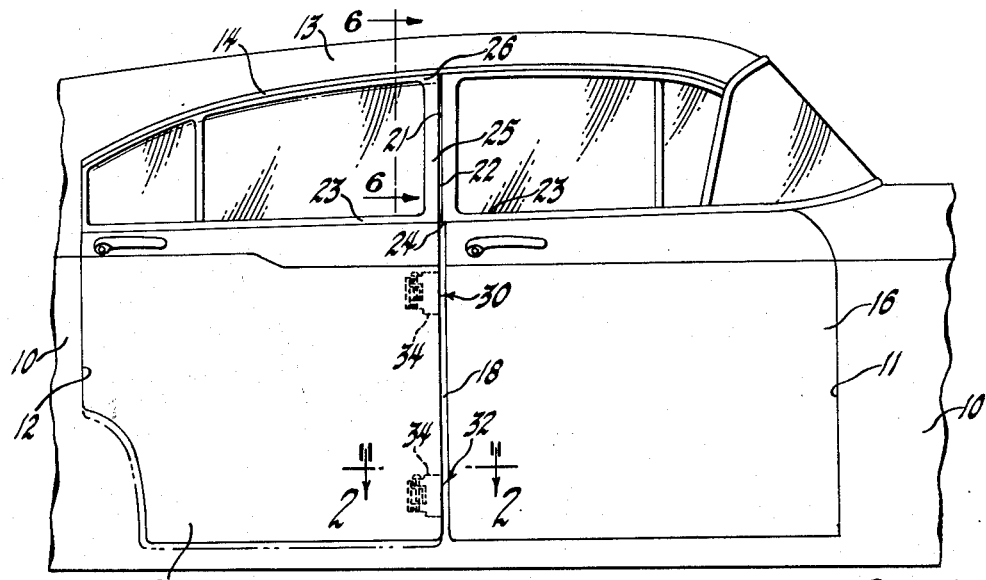
Fig. 1 is a fragmentary side elevational view of an automobile body having a door hung by the improved hinges.
Figure 2:
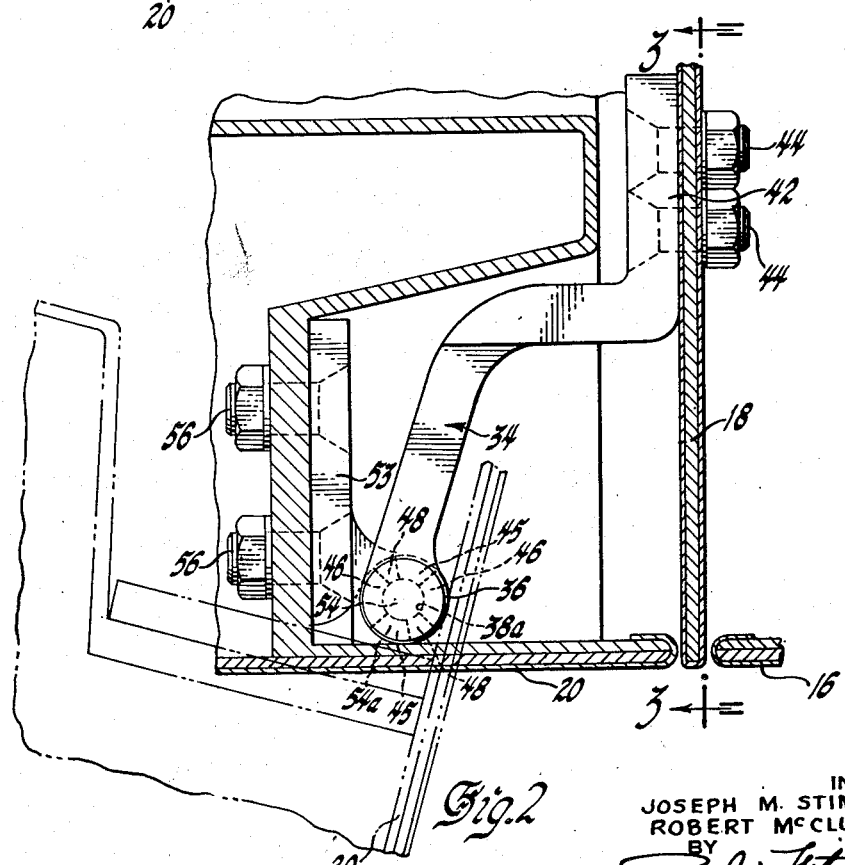
Fig. 2 is an enlarged fragmentary horizontal section taken along the line 2—2 of Fig. 1 and showing one of the improved hinges, the door being shown in closed position in solid lines and in open position in broken lines.

Referring now more particularly to the drawings, Fig. 1 shows a portion of an automobile body comprising a side wall 10 having front and rear door openings 11 and 12 and a roof 13 with a downwardly sloping side edge over the rear door opening terminating in a rain gutter in the location designated by the reference character 14. This roof contour is desirable since it provides a low silhouette for the automobile while maintaining a relatively large door opening. Also, the overhanging edge shields the crack at the top edge of the door. The automobile has a front door 16 hingedly mounted along its forward edge and latched to a center body pillar 18 in conventional manner (not shown). A rear door 20 is mounted on the body in the rear door opening 12, being hinged at its forward edge to the body pillar 18 and latched at its rear edge in conventional manner (not shown). As shown in Fig. 6, the door does not lie in a vertical plane but slopes inwardly so that its free edge rises as the door is opened. This construction is conventional.

As seen in Fig. 1, the body pillar has an offset portion 21 at the belt line so that the pillar is relatively narrow in the area 22 which extends between the belt line 23 and the roof 13, and the door is offset forwardly at the belt line at 24 to complement the offset portion of the pillar and provide a relatively narrow portion 25 above the belt line between the front and rear door windows. Because of the forwardly offset portion of the door and because of the downwardly sloping side edge of the roof, if the door were hinged in conventional manner, the upper front corner 26 of the door would strike the lower edge of the roof as the door swung open. This condition is illustrated diagrammatically in broken lines in Fig. 6, in which the door is shown in broken lines at the level it would assume when open if it were hinged in the conventional manner. From Fig. 6 it may be seen that the door, if hinged in the conventional manner, would strike the lower surface of the rain gutter 14 before it was fully open. In order to prevent this, improved hinges are provided for mounting the door on the body, including a cam in each hinge for lowering the door as it swings from closed to open position. There is an upper hinge designated generally at 30 and a lower hinge designated generally at 32, as shown in Fig. 1. These hinges are identical and only one of them will be described in detail. With the improved hinge the upper edge of the door swings outwardly along a line generally parallel to the lower edge of the rain gutter 14 and there is no physical interference between the door and the rain gutter.

The improved hinge comprises a female hinge member having a C-shaped mounting portion 34 with an upper arm 36 and a lower arm 38 spaced by a recessed portion 40. The mounting portion 34 terminates in a bent end 42 which is mounted on the jamb face of the body pillar 18 by means of heavy screws 44.

The upper surface of the lower arm 38 is the bearing surface for a hinge barrel 52 and, as shown best in Fig. 5, the bearing surface includes oppositely disposed projecting bearing surface portions 45 and oppositely disposed recessed bearing surface portions 46. At one side each projecting surface 45 is spaced from the adjacent recessed surface 46 by a sloping cam surface 48. At its other side each projecting bearing surface is separated from the adjacent recessed bearing surface by a substantially vertical stop surface or shoulder 50, so that there are two oppositely disposed pairs of bearing surfaces, each pair comprising a projecting bearing surface 45, a sloping cam surface 48 and a recessed bearing surface 46.

The hinge also includes a male or barrel part 52 from which extends a mounting bracket 53 connected to the door 20 by heavy screws 56. The hinge parts 36, 38 and 52 have aligned bores 36a, 38a and 52a, respectively, through which extends a hinge pin 54, the head 54a of this pin resting on the upper surface of the hinge arm 36 and the hinge pin being secured to the hinge arm 36 by a lock screw 56a (Figs. 3 and 4). The hinge barrel is slightly more than one-quarter inch shorter than the recess 40 between hinge arms 36 and 38.

As shown best in Fig. 5, the lower bearing surface of the hinge barrel 52 has oppositely located projecting bearing portions 58 and oppositely located recessed bearing portions 60. These bearing portions are arranged in pairs, each pair having surfaces 58 and 60 separated by a sloping cam surface 62, and each pair being separated from the other pair by a substantially vertical stop shoulder 64. The complementary sloping cam surfaces 48 and 62 provide for bodily movement of about one-quarter of an inch between the hinge parts when the door is moved from closed to open position. In Fig. 3, the arrangement of the parts is shown when the door is closed, and in this position, the hinge barrel 52 is so arranged with respect to the hinge arm 38 that the opposite projecting bearing surfaces 58 of the hinge arm 52 rest on the projecting bearing surfaces 45 of the arm 38. When the door is swung to open position, it is lowered so that the upper front corner 26 of the door will clear the downwardly sloping side 14 of the roof. As the door swings, the hinge parts rotate and move bodily relative to each other from the closed position of Fig. 3 to the open position of Fig. 4, the sloping cam surface 62 of the rotatable barrel 52 riding down the sloping cam surface 48 of the hinge part 38 so that the recessed bearing surfaces 60 of the hinge barrel bear upon the projecting bearing surfaces 45 of the arm 38 of the hinge and the projecting surfaces 58 of the barrel bear upon the recessed surfaces 46 of arm 38. When the door is swung closed, this relative bodily movement between the hinge parts is reversed during at least a portion of the pivotal movement of the hinge parts, and the cam surfaces 62 of the hinge barrel 52 ride up the sloping cam surfaces 48 of the hinge arm 38 so that the door is raised about one-quarter of an inch while it is being closed. With the door in its closed position, the projecting bearing surfaces 58 of barrel 52 ride on the projecting bearing surfaces 45 of the lower hinge arm 38, as shown in Fig. 3.

While we have shown and described one embodiment of our invention, it is capable of many modifications. Changes, therefore, in the construction and arrangement may be made without departing from the spirit and scope of the invention as set forth in the appended claims.

We claim:

1. Apparatus of the character described, including: an automobile body having a side wall with a door opening and a roof with a downwardly sloping side edge over the door opening; a door; hinge means for mounting said door on said body in the door opening for swinging movement between closed and open positions, the upper edge of said door being below the sloping side edge of the roof when the door is closed; and a cam in said hinge means for lowering said door as it swings from closed to open position so that the top edge of said door clears the downwardly sloping side edge of the roof.

2. Apparatus of the character described, including: an automobile body having a roof with a sloping side edge, a door, means for mounting said door on said body for swinging movement between closed and open positions with the upper edge of said door below the sloping side edge of the roof when the door is closed, comprising a first hinge part connected to the body and having a cam surface, a second hinge part connected to the door and having a complementary cam surface, and means for mounting said second part on said first part for relative pivotal movement, said cam surfaces being arranged to cause bodily movement between said parts during at least a portion of said pivotal movement to lower the door as it swings from closed to open position so that the top edge of the door clears the sloping side edge of the roof.

3. Apparatus of the character described, including: an automobile body having a side wall with a door opening and a roof with a downwardly sloping side edge over the door opening, a door, means for mounting said door on said body in the door opening for swinging movement between closed and open positions comprising a hinge arm mounted on said body and having an upwardly facing bearing surface with a sloping cam portion, a hinge barrel mounted on said door and having a downwardly facing bearing surface with a complementary sloping cam portion, and a hinge pin interconnecting said parts for relative pivotal movement with the bearing surfaces adjacent each other, said cam surfaces being arranged to cause bodily movement between said parts during at least a portion of said pivotal movement so that said door is lowered as it swings forwardly to open position and the top edge of the door clears the downwardly sloping side edge of the roof.

4. Apparatus of the character described, including: an automobile body having a roof with a sloping side edge; a door; and hinge means for mounting said door on said body for swinging movement between closed and open positions, comprising a female hinge part having an upwardly facing bearing surface with a sloping cam portion, a male hinge part having a downwardly facing bearing surface with a complementary sloping cam portion, and a hinge pin interconnecting said parts for relative pivotal movement with their bearing surfaces adjacent each other, said cam surfaces being arranged to cause bodily movement between said parts during at least a portion of said pivotal movement to lower the door as it swings from closed to open position so that the top edge of the door clears the sloping side edge of the roof.

5. Apparatus of the character claimed in claim 4, wherein each bearing surface comprises a projecting surface portion and a recessed surface portion spaced by a sloping cam surface portion.

References Cited in the file of this patent

UNITED STATES PATENTS

| 919,150 | Garber | Apr. 20, 1909 |
| 1,313,411 | Myers | Aug. 19, 1919 |
| 1,698,390 | Carpenter | Jan. 8, 1929 |
| 2,680,645 | Brill | June 8, 1954 |

FOREIGN PATENTS

| 978 of 1896 | Great Britain | Nov. 28, 1896 |